(12) United States Patent
Deml et al.

(10) Patent No.: US 8,360,524 B2
(45) Date of Patent: Jan. 29, 2013

(54) VEHICLE SEAT WITH VIBRATORY MOTION IN THE HEIGHT DIRECTION

(75) Inventors: Johann Deml, Thanstein (DE); Alexander Lorey, Maxhütte-Haidhof (DE)

(73) Assignee: Grammer AG, Amberg (DE)

( * ) Notice: Subject to any disclaimer, the term of this patent is extended or adjusted under 35 U.S.C. 154(b) by 155 days.

(21) Appl. No.: 12/829,602

(22) Filed: Jul. 2, 2010

(65) Prior Publication Data

US 2011/0001342 A1 Jan. 6, 2011

(30) Foreign Application Priority Data

Jul. 2, 2009 (DE) .......................... 10 2009 031 417

(51) Int. Cl.
*A47C 1/00* (2006.01)
*F16M 13/00* (2006.01)
(52) U.S. Cl. ..................... 297/344.15; 248/588; 248/421
(58) Field of Classification Search ............ 297/344.15, 297/338; 248/431, 421, 588
See application file for complete search history.

(56) References Cited

U.S. PATENT DOCUMENTS

| | | | | |
|---|---|---|---|---|
| 4,151,973 | A | * | 5/1979 | Sedlock .......................... 248/576 |
| 6,554,359 | B2 | | 4/2003 | Kohl et al. |
| 6,644,737 | B2 | * | 11/2003 | Kohl et al. ................. 297/217.1 |
| 7,314,249 | B2 | * | 1/2008 | Becker et al. ............. 297/344.15 |

FOREIGN PATENT DOCUMENTS

| | | |
|---|---|---|
| DE | 3242287 | 5/1984 |
| DE | 10040535 | 10/2001 |
| DE | 102004026036 | 12/2005 |
| DE | 102004026284 | 12/2005 |

OTHER PUBLICATIONS

Chinese Office Action issued Mar. 26, 2012 Application No. 2010102275208.

* cited by examiner

*Primary Examiner* — Milton Nelson, Jr.
(74) *Attorney, Agent, or Firm* — Ballard Spahr LLP

(57) ABSTRACT

What is shown is a vehicle seat having parts for carrying out a vibration movement in the height direction, with the parts comprising the following:

a base part, a top part spring mounted relative to the base part, wherein a height adjustable connection frame comprising at least one first frame arm, at least one second frame arm and at least one spring element is arranged between the base part and the top part, wherein a motion sequence of the parts, which may be carried out in a vibration condition by applying a constant force onto the base part and/or the top part, may be varied in a further vibration condition by applying a variable force onto the base part and/or the top part.

1 Claim, 7 Drawing Sheets

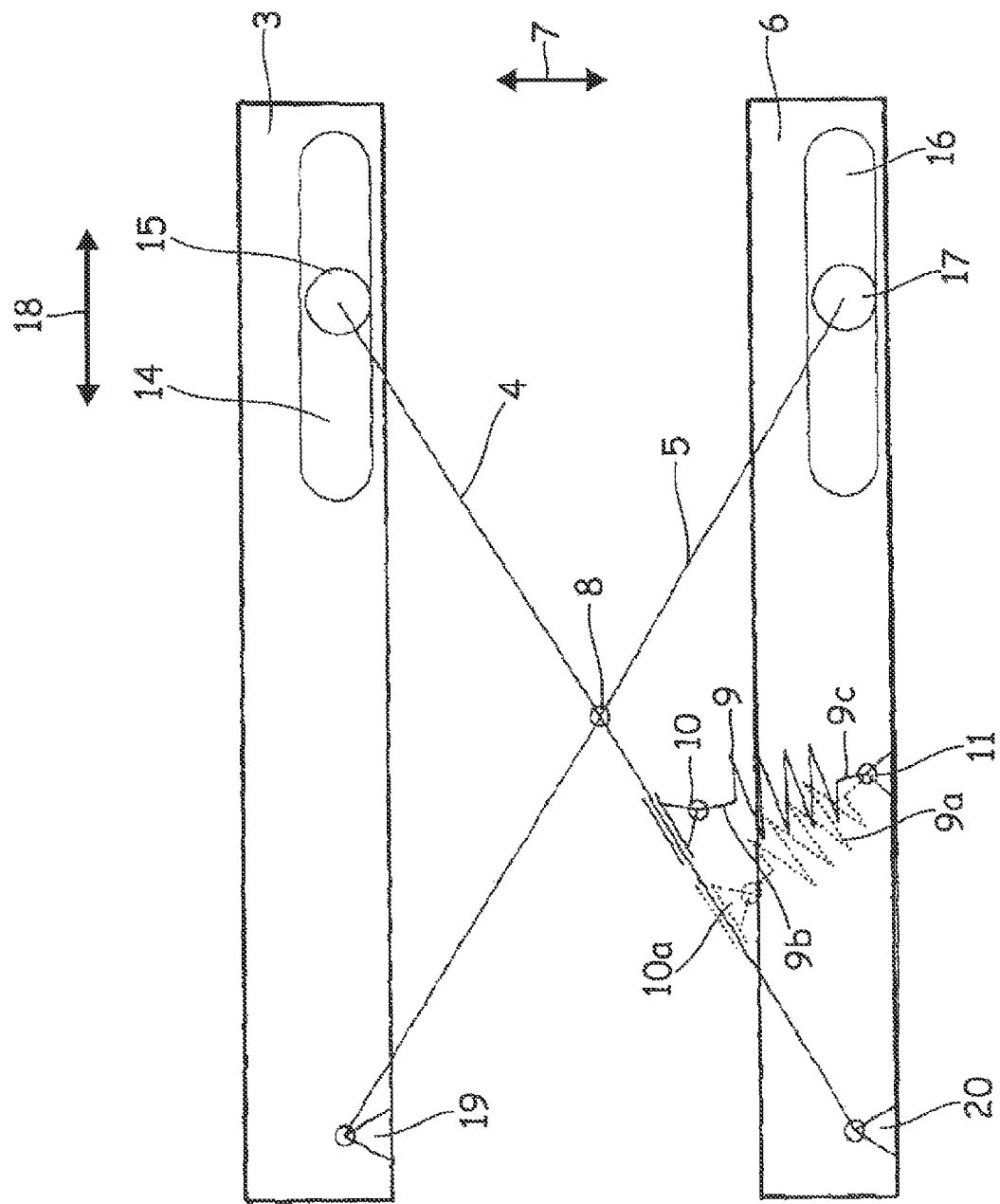

VEHICLE SEAT WITH VIBRATORY MOTION IN THE HEIGHT DIRECTION

CROSS REFERENCE TO RELATED APPLICATIONS

This application is a convention application of German Application Serial Number 10 2009 031 417.2, filed Jul. 2, 2009, which application is hereby incorporated by this reference in its entirety.

BACKGROUND OF THE INVENTION

The invention relates to a vehicle seat having parts for carrying out a vibratory motion in the height direction, which parts comprise a base part, a top part and a height adjustable connection frame arranged there between, as well as at least one spring element, according to the preamble of Patent Claim 1.

It is customary within the vehicle sector that two vehicle parts which are capable of a vibratory motion relative to each other comprise, such as e.g. a seat part having a top part of a vehicle seat, which is spring mounted relative to a vehicle base part, a spring element as well as an additional damping element in the form of a damper, in order to take energy out of the suspension system and to dampen the spring movement, if large deflections of this springy vibrating system are caused in a case of resonance.

Such dampers may be designed in different ways. For example, hydraulic dampers essentially consist of a piston rod having a piston guided in an oil-filled cylinder. During an axial movement of the piston rod with and as a result of the piston relative to the cylinder, the oil has to flow through narrow channels and valves in the piston. As a result of the resistance acting against the oil in the course of this, pressure differentials are generated which generate the damping forces across active surfaces. As the speed of the piston movement increases, the flow resistance and thus the damping action increases, and this characteristic may be specifically influenced within certain limits.

Also known are mechanical shock absorbers which in principle consist of spring-loaded frictional surfaces. The coated leaf springs have several spring elements and represent combined spring/damper units. The shock is absorbed by the flexion of the spring and is stored in the spring. The friction between the individual spring leaves dampens the vibration and converts part of the spring forces into heat.

Also known are air spring dampers wherein the medium air, can carry out both spring and damping actions.

Frequently, such an arrangement of a damper, for example in a vehicle seat or between a driver cabin and a vehicle chassis, requires a complex design in order to obtain an optimum damping of vibrations orientated in different directions and being of different intensities. It is necessary to consider an accurate coordination between the damping and the spring properties, which are to enable for example a seat comfort area within a characteristic curve of spring deflection against force of a vibrating vehicle seat. Moreover, these damper systems have the disadvantage of reducing vibration reduction in the hypo- and hypercritical ranges and thus lead to a deterioration of vibration comfort.

SUMMARY OF THE INVENTION

It is therefore the object of the invention to provide a vehicle seat having improved vibration comfort, comprising at least two vehicle seat parts, namely a base part and a top part, which may be set into a vibratory motion relative to one another by means of at least one spring element, wherein by such a vehicle seat a vibration reduction of a vibration in the height direction without the use of a damping element being necessary for this, or in such a way that the action of a damping element may be assisted thereby. As a result, the necessity for the use of dampers is to be eliminated as a function of the design of the vehicle seat presented herein, or dampers should be used having reduced power dissipation, in order to minimise the negative effect of the damper in the hypercritical range. A hypercritical range is understood to mean the frequency range within which the initiated vibration is reduced.

This object is achieved by means of the features of Patent Claim 1.

An essential point of the invention is that in the case of a vehicle seat having parts for carrying out a vibratory motion in the height direction, a motion sequence of the parts, which may be carried out in a vibration condition upon application of a constant force onto a base part and/or a top part, may be varied in a further vibration condition upon application of a variable force onto the base part and/or the top part.

The parts comprise the base part, the top part which is spring mounted relative to the base part, wherein a height adjustable connection frame consisting of at least one first frame arm and at least one second frame arm and at least one spring element are arranged between the base part and the top part.

The subject matter of the present patent application is based on the following basic concept: a motion sequence of the individual parts has so far been governed by the predetermined geometry of the parts and the points of attachment thereof, which allow a predetermined motion sequence. For example, a scissor frame positioned between a base part and a top part may be pivoted in virtue of the pivot bearings to which it is fastened by the ends of its scissor arms or frame arms. This means, the motion sequence of the entire vibrating connection frame together with the base part and the top part is kinematically predetermined with respect to its travel, since, amongst other things, the pivot bearings or the points of attachment are fixedly connected to the base part and/or the top part.

However, the subject matter of the present invention is directed to a variation of the motion sequence in a kinematic respect upon application of a varying external force, as is the case, for example, when driving over a pothole, where initially a small and later an abruptly increasing force is applied.

A motion sequence that varies in this way may be achieved due to the fact that certain wedges and points of attachment, which so far have been designed to be rigid and position fixed, may be specifically varied in the case of a stronger acting external force for example with respect to their position in such a way that a specific counterforce, which varies at the same time, is generated in order to dampen the vibration generated by the externally applied force.

If a certain acceleration value acts on the vibratory motion of the parts upon application of an abruptly increasing external force, a reduction of this acceleration will develop as a result of a damping action achieved by means of a specific change of the movement of the parts moving relative to one another.

Such a variation of the motion sequence may be achieved for example due to the fact that at least one first point of attachment, of which the position may be changed, is disposed for connecting at least one of the frame arms to the base part and/or the top part in order to cause a motion sequence that may be varied.

Such a first point of attachment may for example be an excenter element attached to one end of the frame arm and fastened to the base part or the top part, its various excenter positions cause a lever change of the frame arm disposed between the base part and the top part.

Such an excenter element allows a specific modification to the attachment of the lever or the position of the end of the frame arm, so that during a vibration in connection with the application of an external force, a specific deviation from the usual motion sequence of the parts relative to one another is effected by means of this and thus, as a result of a changed energy-force transfer function between the parts, a damping of the initiating vibration or force is obtained.

According to a second embodiment, the first point of attachment may represent a pivot connection displaceable in the horizontal direction for a pivotable mounting of one end of the articulation arm. This enables a specific modification or displacement of a pivot connection, e.g. in order to arrange a scissor frame, but also a parallelogram frame, with its frame arms in a different way relative to one another, whilst it carries out a vibratory motion as a result of the applied force. By this means, too, a damping of the applied force by varying the motion sequence may be achieved.

According to a third embodiment, at least one second point of attachment is arranged, of which the position may be changed, for connecting a first end of at least one spring element to at least one of the articulation arms, wherein a second end of the spring element is connected to the base part or the top part. This enables the position of the spring element to be changed, which is disposed between one of the articulation arms of for example a scissor frame and a base part or a top part. As a result of this, the acting spring force of the spring element is varied with regard to its position relative to the frame arm moving at a varying angle, as a result of which an elevated counterforce is achieved as a result of the spring force counteracting against the initiated vibration. This, too, leads to the external force applied during a vibration to be damped. This applies to an upwardly directed as well as to a downwardly directed vibration for all embodiments of the present invention.

In order to achieve a change of the position of the spring element, the second point of attachment is preferably displaceably disposed along the articulation arm.

Alternatively, the spring element may be disposed not along the articulation arm, but along the base part or the top part in such a way that its further end is displaceable. The third point of attachment required for this preferably has means for displacement in the horizontal direction.

The at least one spring element used is preferably formed as an air spring for causing a spring-loaded vibratory motion.

According to a fourth embodiment, at least one of the articulation arms is designed to be extended and retracted by means of an extension mechanism in such a way that its length is varied during the vibratory motion of the vehicle seat. Therefore, the extension and retraction mechanism is designed to be spring and/or damper loaded. This may be achieved for example by receiving a first rod-like frame arm section in a second sleeve-like frame arm section, and within the sleeve-like frame arm section, a spring for an springy extension and retraction of the rod-shaped articulation arm is integrated in the sleeve-like frame arm section. Also as a result of this, because of such an arrangement of the lengths of the articulation arms for example of a scissor-like connection frame, a variation of the motion sequence within a vibration carried out by the vehicle seat would be achieved by applying an external force and thus a counterforce or a damping force may develop.

According to a further embodiment, at least one fourth point of attachment, of which the position may be changed, for connecting a first end of at least one further spring element to at least one rail or rod element attached to the top part or the bottom part is provided. Here, the rail or rod element may be an element disposed with one of the articulation arms at a fixed angle, so that the deflection of the rail or rod element is accompanied by an upwardly or downwardly directed movement of the articulation arms, and as a result of this a different counterforce action against the external force may be generated at the same time. The reason is that as a result of a modification of the frame arms and an external force acting on the vehicle seat, the fourth point of attachment which is displaceably disposed on the rail or rod element is specifically displaced, whereby the point of action of the spring force of the further spring element is changed and thus also the counterforce built up as a result of the spring force is varied. This in turn causes a damping during the motion sequence of the parts and thus a reduction of the vibration of the vibrating vehicle seat upon application of an external force.

Further advantageous embodiments will become evident from the dependent claims.

BRIEF DESCRIPTION OF THE DRAWINGS

Advantages and expediencies will become evident from the following description in connection with the figures, wherein:

FIG. 4a shows a schematic view of the vibratory substructure according to a third embodiment of the invention in a first position of the spring element used;

FIG. 1 shows a schematic view of a vehicle seat 1. The vehicle seat includes one or several upholstered elements 2 as well as a top part 3 disposed below the upholstered element and a bottom part 6. A connection frame is disposed between the top part 3 and the bottom part 6, which is preferably designed as a scissor frame having the frame arms 4, 5.

The vehicle seat may vibrate upwards and downwards in the height direction 7, which may mean both a movement of the top part 3 directed towards the bottom part 6 and a movement of the bottom part 6 directed towards the top part 3.

Figure 1:
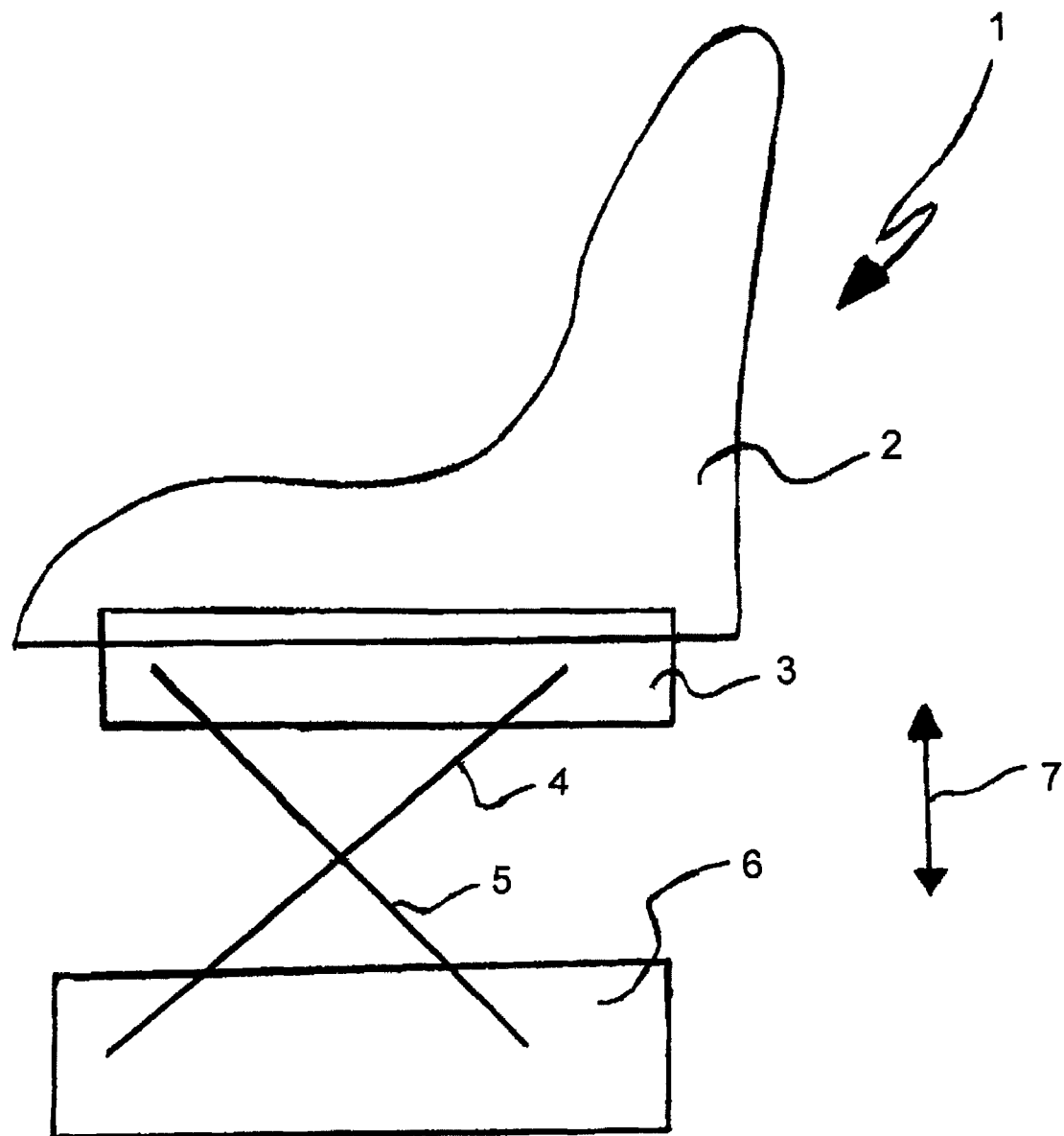
FIG. 1 shows a first schematic view of a vehicle seat having a vibratory substructure.
Figure 2:
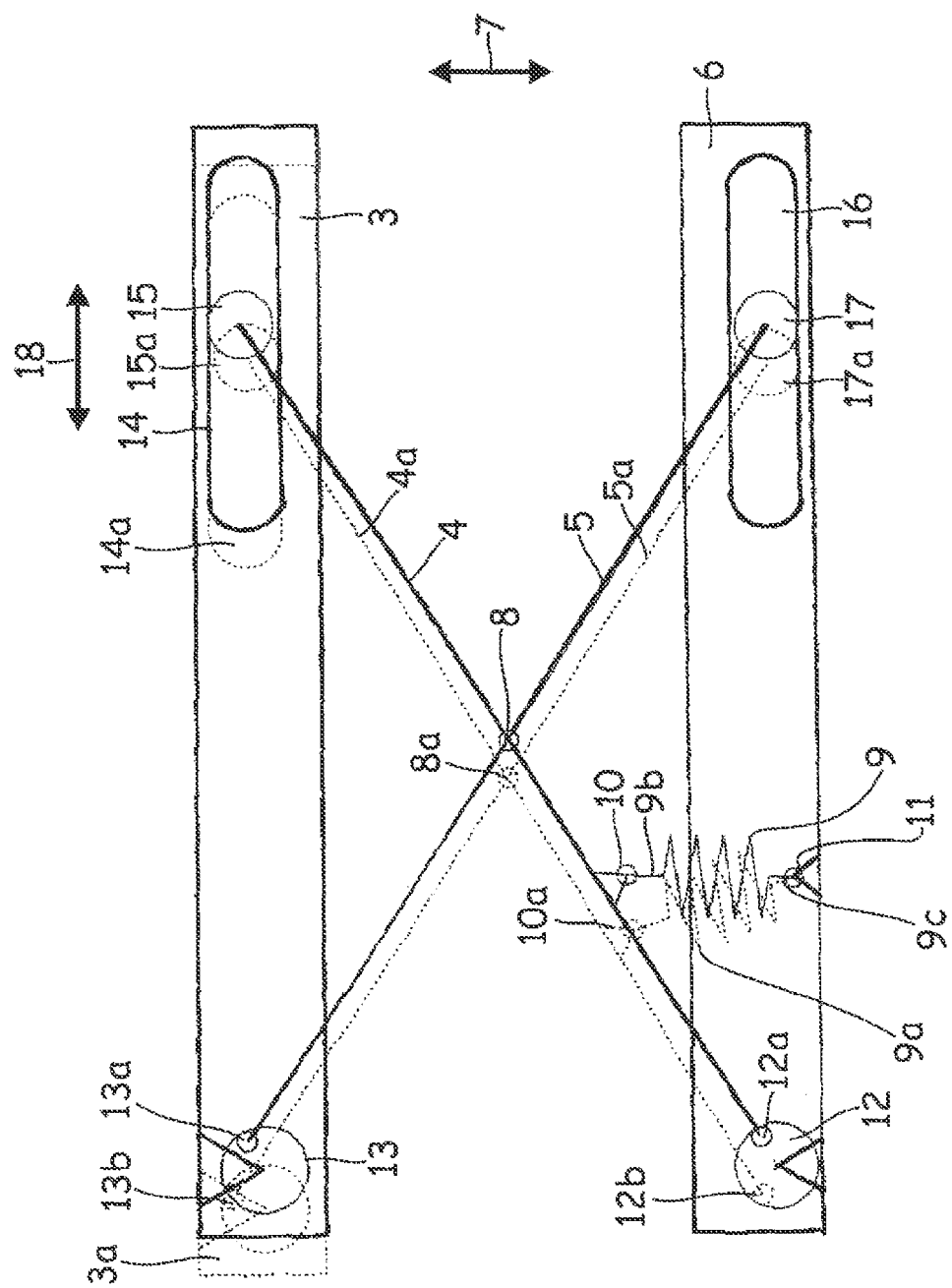
FIG. 2 shows a schematic view of the vibratory substructure according to a first embodiment of the invention.

FIG. 2 shows a schematic view of the substructure of the vehicle seat shown in FIG. 1 according to a first embodiment of the invention. The substructure comprises the top part 3, the bottom part 6 and the scissor arms 4 and 5 disposed there between.

It can be seen from the view shown in FIG. 2 that the solid lines indicate a first condition of the vibrating substructure during a vibratory motion and the dotted lines show a second vibration condition of the vibrating substructure after a specific variation of the motion sequence.

In the first condition, a movement of the two scissor arms 4, 5 takes place upon application of an external force, such as for example acts on the top part 6 when driving over a hump, which scissor arms are usually connected to one another in a common point of articulation 8. A spring 9 which is preferably formed as an air spring and has a first end 9b and a second end 9c is connected to the scissor arm 4 at a first point of attachment 10 and to the base part 6 at a second point of attachment 11.

Usually, the normal motion sequence of this scissor frame would take place in such a way that rail-like guiding elements 14, 16 or the like or roller elements 15, 17 disposed thereon are displaced within recesses towards the right or left in a horizontal direction, as a result of which a change of position of the scissor frame is made possible, with the movement of the top part 3 being influenced by an applied external force to a degree which is as small as possible.

In the case of a specific kinematic variation of the motion sequence upon application of an external force, however, an excenter element 12 and a further excenter element 13 will be modified with regard to its rotary position according to the positional view with the dotted lines in such a way that it will move from an initial position 12a, 13a to a second position 12b, 13b. This causes a specific change of the position and a specific variation of the motion sequence of all of the involved parts, as is indicated by the reference numerals 3a, 4a, 5a, 8a, 9a, 10a, 14a, 15a and 17a. Thus, a change of the top part 3a in the horizontal direction, which means a change of position, is effected. This enables another position of the first end 9b of the spring element 9 with regard to the scissor arm 4a as reflected by the offset first point of attachment 10a. Hereby, another spring force is exerted on the scissor arm 4a, which leads to an enhanced counterforce due to the smaller distance between the point of attachment 10a and the point of attachment 11. This leads to a damping of the vibration caused by the applied external force and thus to a weakening of the vibration.

Figure 3:
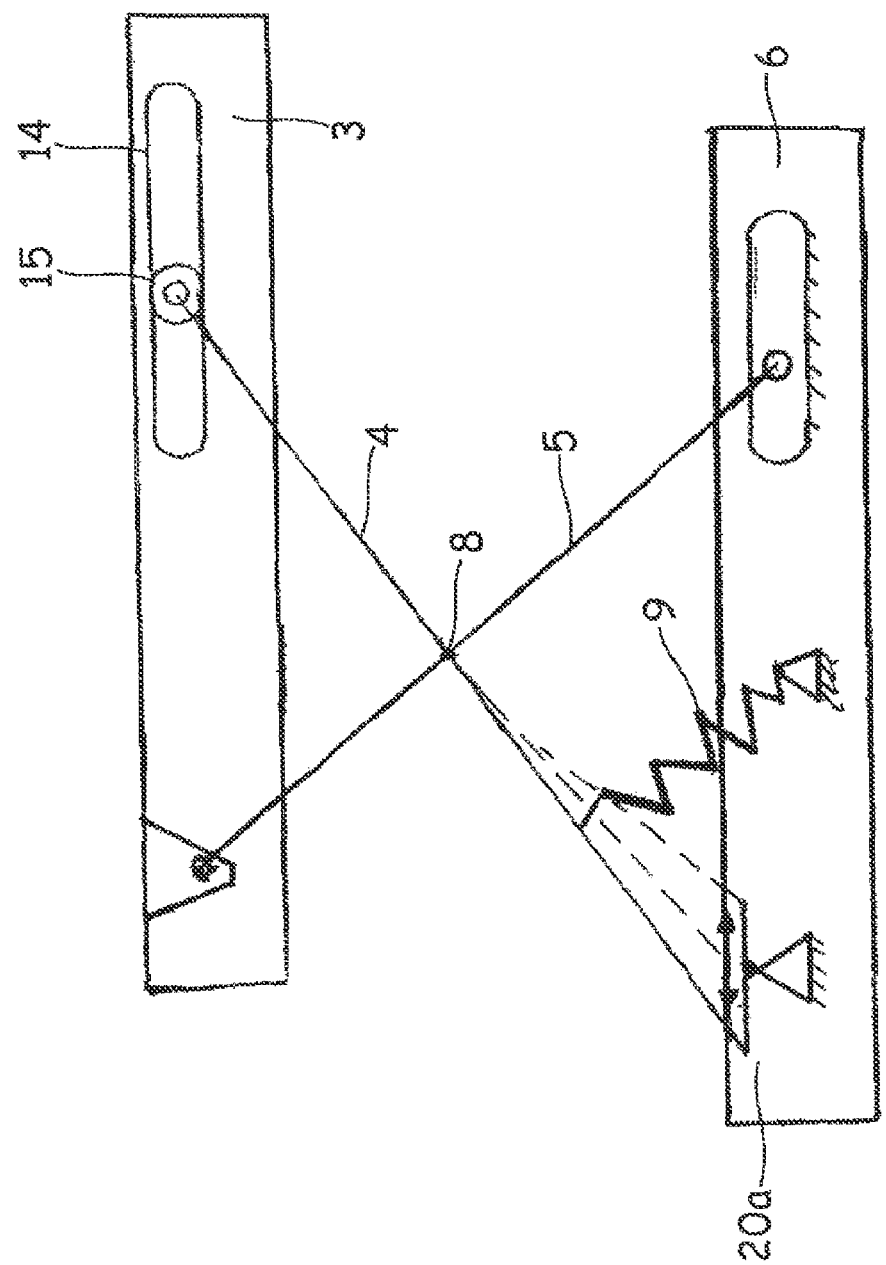
FIG. 3 shows a schematic view of the vibratory substructure according to a second embodiment of the invention.

FIG. 3 shows a schematic view of a second embodiment of the invention, wherein like and equivalent parts are identified with the same reference numerals.

It can be seen from this view that compared to the first embodiment shown in FIG. 2, a displaceable point of attachment 20, 20a is used instead of an excenter element 12, which causes a different orientation of the deflection of the scissor arm 4. This in turn causes a different attachment of the first end 9b of the spring element 9 so that an enhanced counterforce with regard to the applied external force is built up. As a result, the initiated vibration is damped.

FIG. 4a again shows a vibratory substructure of the vehicle seat according to a third embodiment of the invention. Like and equivalent parts are identified with the same reference numerals.

According to the view shown in FIG. 4a, the point of attachment between the spring element 9 and the scissor arm 4 is designed as a displaceable second point of attachment 10, which in a second displacement position 10a according to the form of the spring element 9 shown as a dotted line is displaced closer towards the first point of attachment 20. As a result, an increased counter spring force of the spring element 9 acts on the point of attachment 10a and thus on the scissor arm, as a result of which a counterforce built up against the applied force may be generated. This in turn causes a damping of the entire vibration system to be achieved.

Figure 4B:
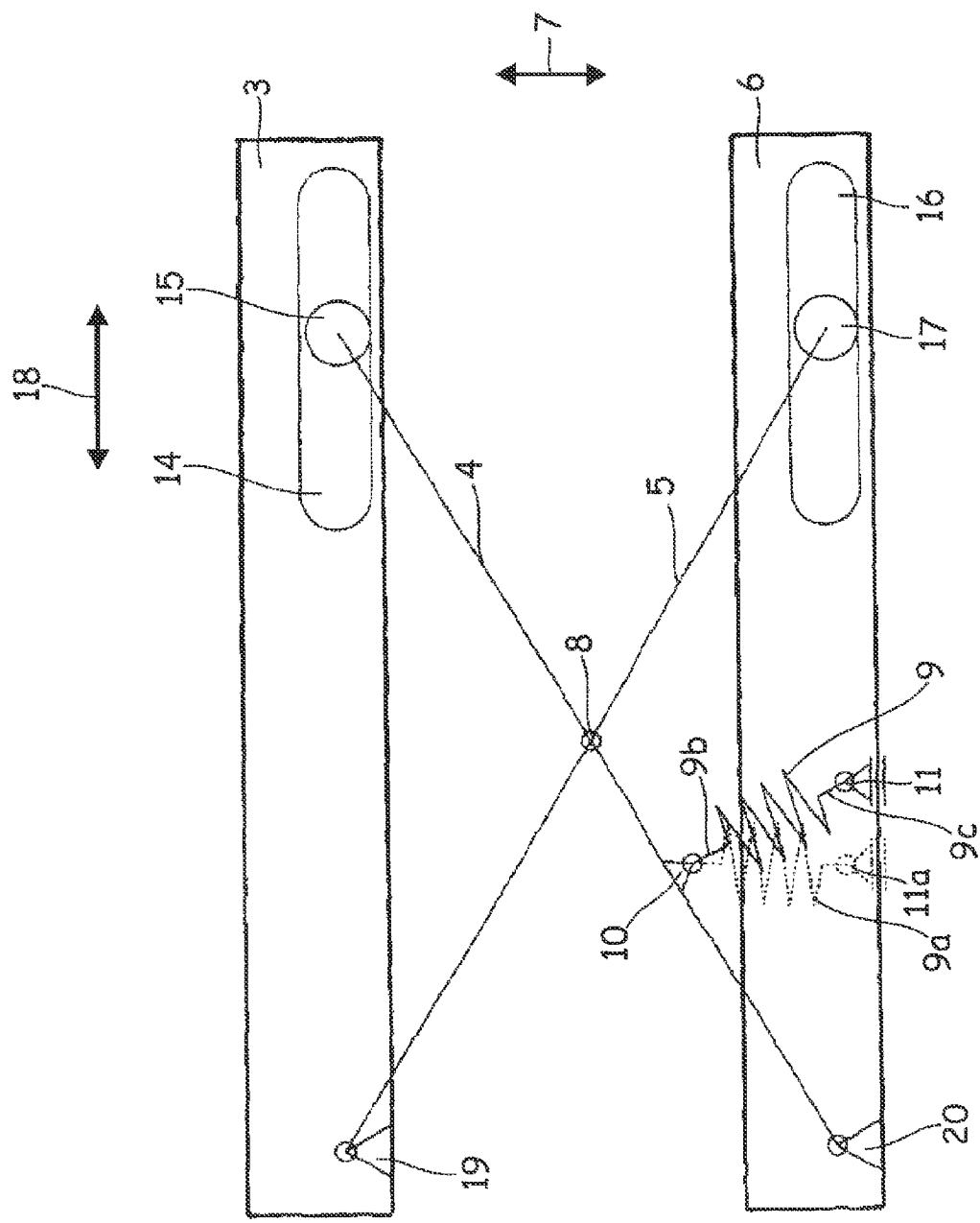
FIG. 4b shows a schematic view of the vibratory substructure according to the third embodiment of the invention in the second position of the spring element used.

Similar to the embodiment shown in FIG. 4a, in the embodiment shown in FIG. 4b, it is not the upper end 9b of the spring element 9 that is designed to be displaceable, but the lower end 9c of the spring element 9. The third point of attachment 11, which is disposed on the lower end or the second end 9c of the spring element 9, may be displaced in the horizontal direction on the bottom part 6, as is shown in the representation by the dotted lines and by reference numeral 11a. As a result, the spring element 9 will adopt the position identified with reference numeral 9a and will thus generate a higher counterforce which will lead to a damping effect and a reduction of vibration.

Within the recesses or guiding elements 14, 16, the roller elements 15, 17 may be displaced backwards and forwards along the direction of the arrow 18.

Figure 5:
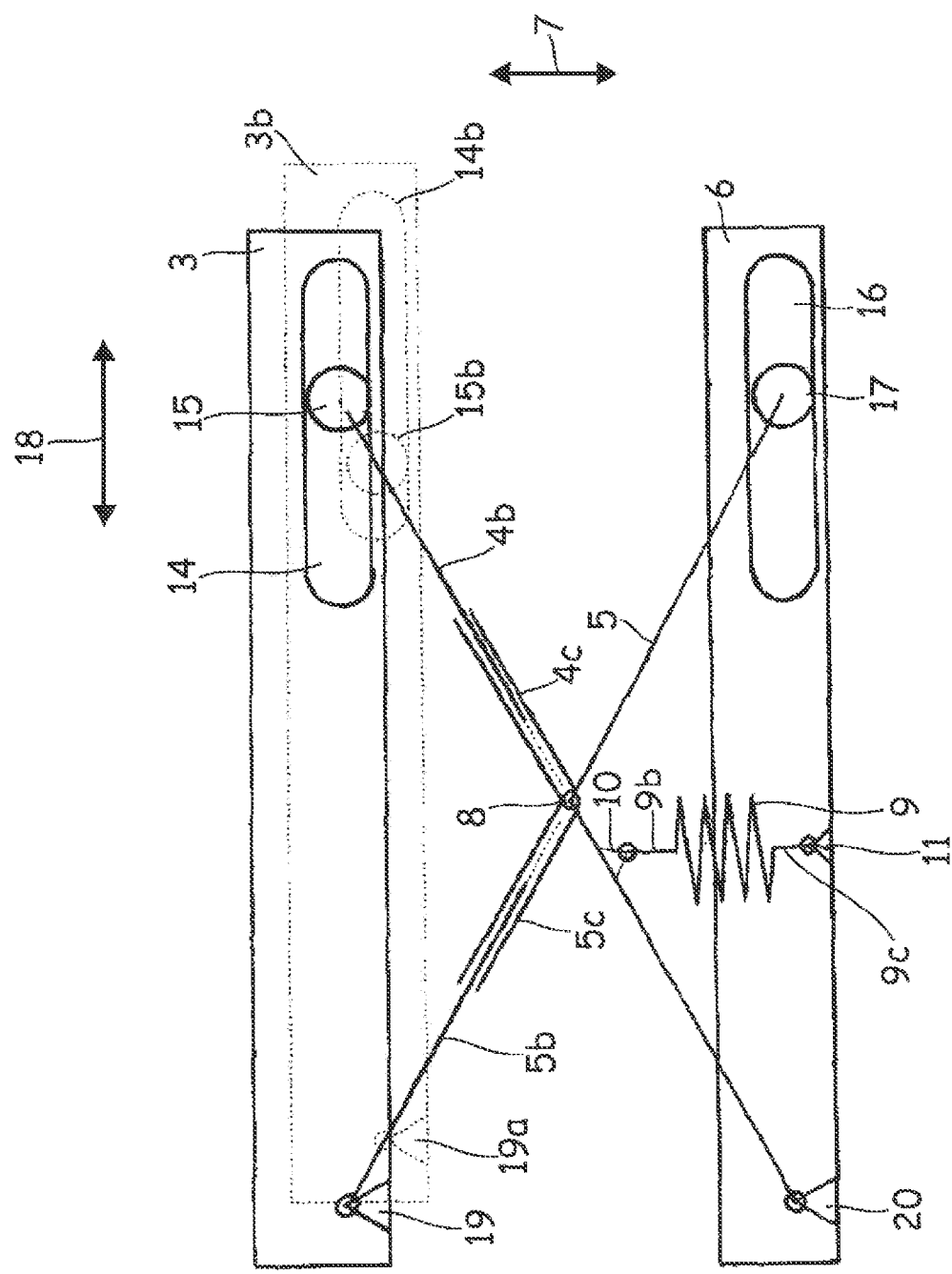
FIG. 5 shows a schematic view of the vibratory substructure according to a fourth embodiment of the invention.

According to a further embodiment shown in a schematic view in FIG. 5, the scissor arms 4 and 5 are now designed to be extendable and retractable, as is identified by the reference numerals 4b, 4c, 5b, 5c. The first scissor arm sections 4b and 5b, which are for example of a rod-like design, are guided within second scissor arm sections 4c, 5c in a sleeve-like configuration and are preferably loaded again on their ends, so that an springy or damping effect may be achieved within these eyelet-like scissor arm sections. By means of such an embodiment of the scissor arms 4, 5, a longitudinal displacement or a variation of the length of the scissor arms 4, 5 is possible. This causes a change of the position of the top part 3 as indicated in the form of a dashed line and identified with reference numeral 3b. Likewise, the position of the roller element 15b and of the guiding element 14b and the pivot bearing or the point of attachment 19a change.

In this way, too, a specific build-up of a counterforce against an applied external force may be effected and thus a damping and a reduction of vibration may be achieved.

Figure 6:
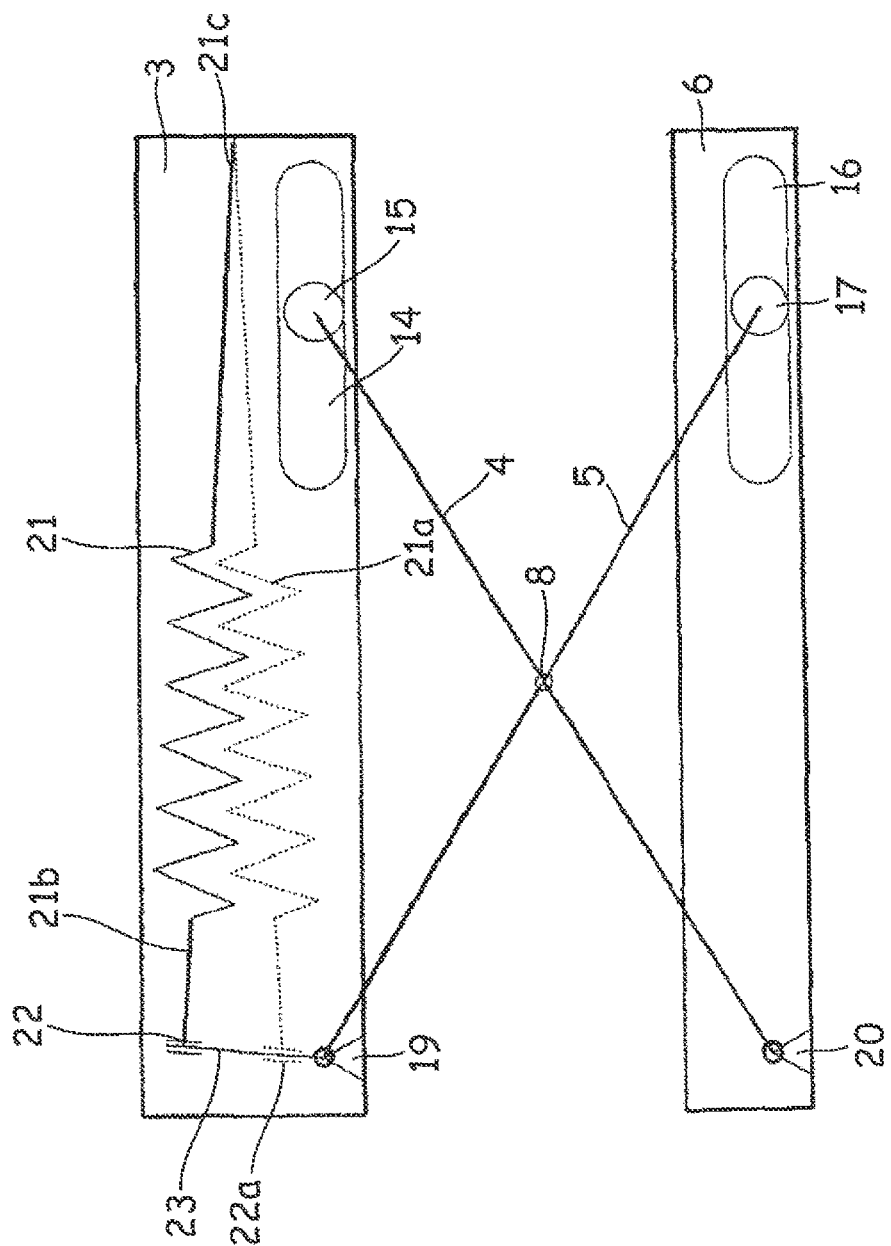
FIG. 6 shows the vibratory substructure according to a fifth embodiment of the invention.

FIG. 6 shows a schematic view of a further embodiment of the invention of the vibratory substructure. Like and equivalent parts are identified with the same reference numerals.

This view shows that a rail or rod element 23 is additionally disposed on the point of attachment 19, preferably connected to the scissor arm 5. On this rail or rod element 23, a displaceable fourth point of attachment 22, 22a is disposed, which is connected to one end 21b of a further spring element 21, which preferably extends approximately in a horizontal direction.

The spring element 21 may adopt several positions. Two possible positions are identified here by means of the reference numerals 21 and 21a or 22 and 22a. The spring element 21 is fastened at its second end 22c to the right hand side of the top part 3.

As soon as a desired variation of the motion sequence is targeted due to a change of the applied external force, a displacement of the point of attachment 22 to the position in the point of attachment 22a is effected, as a result of which a change of the position of the spring 21a is achieved. As a result of this, another spring force acts on the overall vibratory system and thus a specific counterforce may be built up.

A control device may be provided for all of the embodiments, in order to vary the motion sequence as shown in the above figures, which controls such a specific displacement of points of attachment or a change of lengths of the scissor arms when an external force is applied. Alternatively, of course, a mechanical displacement of the point of attachment or a variation of the lengths of the scissor arms may be carried out, also by means of a skilful geometric arrangement of the involved parts, in an automatic form.

All of the features disclosed in the application documents are claimed as being essential to the invention, as far as they are novel over the prior art either individually or in combination.

LIST OF REFERENCE NUMERALS

1 Vehicle seat
2 Upholstered elements
3 Top part
4, 4a, 4b, 4c Frame arm, extension mechanism
5, 5a, 5b, 5c Frame arm, extension mechanism
6 Base part
7 Height direction
8 Point of articulation
9 Spring element
9a, 9b Ends of the spring element
10, 10a Second point of attachment
11, 11a Third point of attachment
12, 12a, 12b Position-variable point of attachment, excenter element
13, 13a, 13b Position-variable point of attachment, excenter element
14, 16 Guiding element
15, 17 Roller element
18 Direction of arrow
19 Point of attachment
20, 20a Pivot connection
21 Spring element
22, 22a Fourth point of attachment
23 Rail or rod element

What is claimed is:

1. A vehicle seat including parts for carrying out a vibratory movement, which parts comprise the following:
a base part,
a top part, spring mounted relative to the base part,
a height adjustable connection frame arranged between the base part and the top part comprising at least one first frame arm, at least one second frame arm and at least one spring element attached at one end to one of the frame arms and at the other end to the base part or the top part,
at least one position-variable first point of attachment for connecting at least one of the frame arms to the base part and/or the top part in order to cause a variable motion sequence,
characterized in that
the first point of attachment constitutes an excenter element connected to an end of the frame arm and attached to the base part or the top part, its various excenter positions cause a lever change of the frame arm disposed between the base part and the top part, and
a motion sequence of the parts, which can be carried out in a vibration condition by applying a constant force onto the base part and/or the top part, can be varied in a further vibration condition by applying a variable force onto the base part and/or the top part.

* * * * *